United States Patent [19]

Isozumi

[11] Patent Number: 4,487,174
[45] Date of Patent: Dec. 11, 1984

[54] ENGINE STARTER
[75] Inventor: Shuuzo Isozumi, Himeji, Japan
[73] Assignee: Mitsubishi Denki Kabushiki Kaisha, Tokyo, Japan
[21] Appl. No.: 547,773
[22] Filed: Nov. 1, 1983
[30] Foreign Application Priority Data
Nov. 6, 1982 [JP] Japan .......................... 57-168905[U]
[51] Int. Cl.³ .......................................... F02N 17/00
[52] U.S. Cl. .................... 123/179 J; 74/527; 74/6; 192/84 C; 192/90
[58] Field of Search .............. 123/179 J, 179 K; 74/6, 74/7 C, 572; 192/84 C, 90

[56] References Cited
U.S. PATENT DOCUMENTS

| 1,284,850 | 11/1918 | Aichele | 123/179 J |
|---|---|---|---|
| 2,309,413 | 1/1943 | Neracher et al. | 123/179 J |
| 4,187,938 | 2/1980 | Miller | 192/84 C |
| 4,259,930 | 4/1981 | Hofbauer | 123/179 J |
| 4,372,262 | 2/1983 | Kaniut | 123/179 J |
| 4,425,520 | 1/1984 | Hiraga | 192/84 C |

FOREIGN PATENT DOCUMENTS

| 0038368 | 3/1983 | Japan | 123/179 J |
|---|---|---|---|
| 0355826 | 8/1931 | United Kingdom | 74/7 C |
| 0608318 | 9/1948 | United Kingdom | 123/179 J |

Primary Examiner—Parshotam S. Lall
Attorney, Agent, or Firm—Robert E. Burns; Emmanuel J. Lobato; Bruce L. Adams

[57] ABSTRACT

An engine starter comprises a flywheel relatively rotatably mounted on the engine crank shaft and an electromagnetically operated clutch for selectively connecting and disconnecting the flywheel and the crank shaft. The rotational energy of the engine started by any conventional starter is stored in the flywheel which keeps rotating when the flywheel is disconnected from the crank shaft, and the stored energy in the rotating flywheel can be used to crank the engine.

4 Claims, 1 Drawing Figure

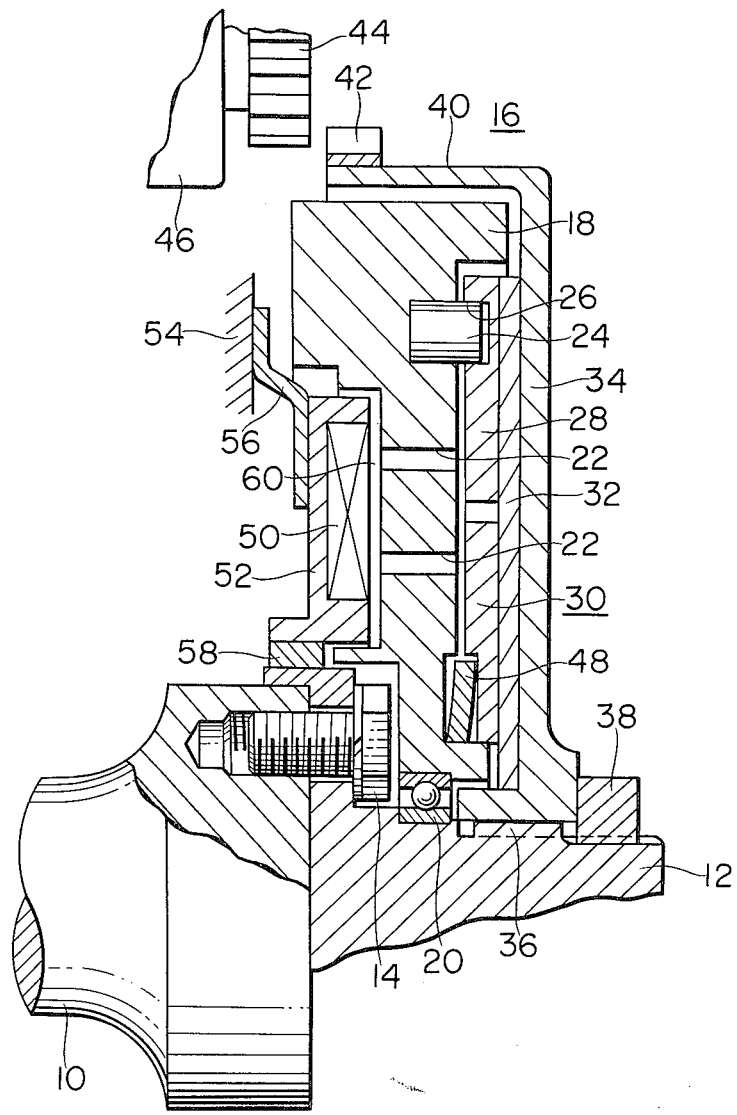

ENGINE STARTER

BACKGROUND OF THE INVENTION

This invention relates to engine starters and more particularly to engine starters for re-starting internal combustion engines.

Internal combustion engines, particularly those used in automobiles, are started by an engine starter motor which is a combination of an electric motor driven by a battery and a pinion gear that is electromagnetically moved into engagement with a ring gear on the flywheel of the engine and is rotated by the motor when an ignition switch is turned on. Once the engine has been started, the starter switch is turned off to stop the motor and the pinion gear becomes disengaged from the ring gear.

Recently conceived energy-saving schemes involve the complete shut off of the internal combustion engine when the engine is in the idle state, such as when the car is waiting for a traffic signal to turn green, thereby saving the gasoline that has heretofore been wasted during idling of the engine.

If an internal combustion engine with an ordinary starter motor is shut off for each traffic signal, the starter motor, which consumes significant electric energy from the battery, must be quite frequently energized to restart the engine, leading to a quick "death" of the battery.

SUMMARY OF THE INVENTION

Accordingly, an object of the present invention is to provide an engine starter that does not use electric power.

Another object of the present invention is to provide an engine starter that can frequently re-start the engine without shortening the life of the battery.

Still another object of the present invention is to provide an engine starter that utilizes the mechanical energy of the engine to re-start the engine.

With these objects in view, the present invention provides an engine starter for an internal combustion engine including a rotary crank shaft that comprises a flywheel relatively rotatably mounted on the crank shaft and a disc plate secured on the crank shaft for rotation with the crank shaft. A disc-shaped clutch plate having a magnetic armature and a friction plate on the armature is disposed between the flywheel and the disc plate. The clutch plate transmits rotating energy or torque between the disc plate and the flywheel when the clutch plate is positioned in an engaging position. In one embodiment, the magnetic armature of the clutch plate is axially slidably mounted on the flywheel and the frictional disc faces the disc plate. The engine starter further comprises a bias spring disposed between the flywheel and the clutch plate for resiliently biasing the clutch plate toward the engaging position. In order to overcome the biasing force that put the clutch plate into the engaging position and to move the clutch plate into the disengaging position, an electromagnetic coil is provided for generating, when energized, a magnetic flux that separates the clutch plate from the disc plate against the action of the biasing spring. The magnetic coil may be mounted on the engine on the opposite side of the clutch plate with respect to the flywheel. A ring gear may be provided on the outer periphery of the disc plate so that a pinion gear of a conventional starter motor may mesh.

According to the present invention, the rotational energy of the engine can be stored in the flywheel in the form of rotational energy by properly connecting and disconnecting the flywheel with the crank shaft of the engine. Therefore this energy stored in the rotating flywheel can be used to crank the crank shaft to re-start the engine.

BRIEF DESCRIPTION OF THE DRAWING

The present invention will become more readily apparent from the following description of the preferred embodiment of the present invention taken in conjunction with the accompanying drawing, in which the sole FIGURE is a fragmental sectional view of an engine starter according to the present invention.

DESCRIPTION OF THE PREFERRED EMBODIMENT

In the FIGURE, it is seen that a crank shaft 10 of an internal combustion engine has a hub 12 secured at its end by screws 14. The hub 12 may be formed integrally with the crank shaft 10.

An engine starter 16 of the present invention is mounted on the hub 12 of the crank shaft 10 and comprises a flywheel 18 rotatably mounted on the hub 12 by a ball bearing 20 so that it freely rotates about the hub 12 of the crank shaft 10 while being prevented from moving in the axial direction. The flywheel 18 is made of a magnetic material and has magnetic flux shielding slits 22 the purpose of which will become apparent later. The flywheel 18 also has a plurality of pins 24 having one end secured to the flywheel 18 and extending in the axial direction. The other end of each pin 24 is slidably received within one of a number of recesses 26 formed in a magnetic armature 28 of a disc-shaped clutch plate 30 including a friction plate 32. Thus, the clutch plate 30 is supported on the flywheel 18 and axially movable along the guide pins 24, but no rotational movement about the crank shaft 10 relative to the flywheel 18 is allowed.

The starter 16 further comprises a disc plate 34 fixedly mounted on the hub 12 of the crank shaft 10 by means of splines 36 and a stop nut 38 or other appropriate means. The disc plate 34 of the illustrated embodiment has a cylindrical extension 40 at its periphery to circumferentially surround the outer periphery of the flywheel 18. The extended end of the cylindrical extension 40 has formed thereon a ring gear 42 around the extension 40. This ring gear 42 can be engaged by a pinion gear 44 of a starter motor 46 of a conventional structure.

In order to put the clutch plate 30 in an engaging position in which the friction plate 32 of the clutch plate 30 is pressed against the surface of the disc plate 34 and the torque on the flywheel 18 or the disc plate 34 can be transmitted through the clutch plate 30 to the disc plate 34 or the flywheel 18, a biasing means such as a spring washer 48 biasing the clutch plate 30 toward the engaging position is disposed between the flywheel 18 and the clutch plate 30.

An electromagnetic coil 50 is disposed adjacent to the flywheel 18 opposite to the clutch plate 30 in order that the clutch plate 30 may be selectively moved between the illustrated engaging position and the disengaged position in which the clutch plate 30 is shifted toward the left in the FIGURE and separated from the inner surface of the disc plate 34. The electromagnetic coil 50 is a substantially ring-shaped coil extending around the hub 12 of the crank shaft 10 and mounted in an annular yoke member 52, made of a magnetic material, which is securely supported from the engine casing 54 by a bracket 56. The inner periphery of the yoke member 52 is also supported on the hub 12 of the crank shaft 10 through a sleeve bearing 58 so that the electromagnetic coil 50 is magnetically associated with the flywheel 18 with a small air gap 60 therebetween which is small enough to establish a magnetic circuit extending from one edge of the yoke member 52 surrounding the electromagnetic coil 50 through the air gap 60, through the flywheel 18 which has the magnetic shielding slits 22 formed therein for efficiently forming a magnetic path between the flywheel 18 and the armature 28, and through the armature 28 from which the circuit returns to the other edge of the yoke member 52 through the flywheel 18 and the air gap 60.

When it is desired to start an engine equipped with the engine starter of the present invention after a relatively long stand-still period, the starter motor 46 of the conventional structure is energized to simultaneously turn the pinion gear 44 of the starter motor 46 and shift it into engagement with the ring gear 42 on the disc plate 34 of the engine starter 16 of the present invention. The rotation of the ring gear 42 and the disc plate 34 is transmitted through the splines 36 to the hub 12 of the crank shaft 10, enabling the engine to be cranked. During this starting mode of operation, the electromagnetic coil 50 is preferably deenergized, allowing the spring washer 48 to press the clutch plate 30 against the disc plate 34. Therefore, the torque applied to the disc plate 34 is transmitted to the flywheel 18 through the clutch plate 30, and the flywheel 18 rotates together with the disc plate 30 and the crank shaft 10. This connected state is maintained while the vehicle on which the engine is mounted is operating at a speed above a certain relatively high level.

When the car engine decelerate to stop at a traffic light or for any other reason, the electromagnetic coil 50 is energized. A magnetic flux is then generated to extend between the yoke member 52 and the armature 28 of the clutch plate 30, thereby magnetically shifting the clutch plate 30 from the illustrated engaging position to the disengaged position in which the friction plate 32 of the clutch plate 30 is separated from the inner surface of the disc 34. The engine ignition switch can then be switched off to stop the rotation of the engine. Even after the engine stops, the flywheel 18 keeps rotating due to its rotational inertia, storing the rotational energy gained while the engine was rotated.

When the engine is to be re-started, it is not necessary to again energize the starter motor 46 to crank the engine. It is only necessary to deenergize the electromagnetic coil 50. When the coil 50 is deenergized, the rotating clutch plate 30 is moved into the engaging position to frictionally contact the disc plate 34 by the spring 48, thus transmitting the rotational movement of the flywheel 18 to the disc plate 34 to crank the engine. This connected state is held until the engine is again decelerated and the engine speed is decreased below the predetermined relatively high speed.

Thus, as long as each intermittent stoppage of the engine is sufficiently short to maintain the stored rotating energy in the flywheel at a level effective for cranking the engine, the engine starter of the present invention can repeatedly crank the engine without dissipating the limited electric power in the battery.

What is claimed is:

1. An engine starter for use with an internal combustion engine having a rotary crank shaft, comprising:
    a flywheel relatively rotatably mounted on the crank shaft;
    a disc plate fixedly mounted on the crank shaft for rotation therewith;
    a substantially disc-shaped clutch plate having a magnetic armature and friction plate thereon and disposed between said disc plate and said flywheel for transmitting torque therebetween, said clutch plate being mounted on said flywheel and axially movable relative thereto between an engaging position in which the friction plate frictionally contacts the disc plate and a disengaged position in which the friction plate is spaced from the disc plate;
    a biasing means disposed between said flywheel and said clutch plate for always biasing said clutch plate toward said engaging position; and
    an electromagnetic coil magnetically associated with said magnetic armature for generating, when energized, a magnetic flux that magnetically moves said clutch plate away from said engaging position against the action of said biasing means.

2. An engine starter as claimed in claim 1, wherein said magnetic armature of said disc-shaped clutch plate is axially slidably mounted on said flywheel, said friction plate faces said disc plate, and said biasing means comprises a spring washer disposed between said armature and said flywheel.

3. An engine starter as claimed in claim 2, wherein said electromagnetic coil is fixedly mounted on the engine such that said magnetic flux therefrom extends through said flywheel to reach said magnetic armature.

4. An engine starter as claimed in claim 1, wherein said disc plate has a ring gear on its periphery, said ring gear being engageable with a starter motor pinion.

* * * * *